US010909630B2

(12) United States Patent
Baxter

(10) Patent No.: US 10,909,630 B2
(45) Date of Patent: Feb. 2, 2021

(54) SYSTEM AND METHOD FOR PROVIDING RISK RECOMMENDATION, MITIGATION AND PREDICTION

(71) Applicant: iMitig8 Risk LLC, Coral Gables, FL (US)

(72) Inventor: David Baxter, Coral Gables, FL (US)

(*) Notice: Subject to any disclaimer, the term of this patent is extended or adjusted under 35 U.S.C. 154(b) by 669 days.

(21) Appl. No.: 15/458,139

(22) Filed: Mar. 14, 2017

(65) Prior Publication Data

US 2018/0268313 A1   Sep. 20, 2018

(51) Int. Cl.
*G06Q 40/08* (2012.01)
*G06Q 10/06* (2012.01)
*G06N 20/00* (2019.01)

(52) U.S. Cl.
CPC ......... *G06Q 40/08* (2013.01); *G06Q 10/0635* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 5,913,201 A * | 6/1999 | Kocur | ................... | G06Q 10/04 705/7.17 |
| 6,633,900 B1 * | 10/2003 | Khalessi | ............... | H04W 12/08 709/202 |
| 7,113,889 B2 * | 9/2006 | Hatano | ............. | G01C 21/3461 702/183 |
| 2010/0042451 A1 * | 2/2010 | Howell | ................. | G06F 11/008 705/7.28 |
| 2011/0077950 A1 * | 3/2011 | Hughston | .............. | G06Q 40/08 705/1.1 |
| 2015/0235322 A1 * | 8/2015 | Emison | .................. | G06Q 40/08 705/4 |
| 2016/0042304 A1 * | 2/2016 | Maloney | ............ | G06Q 10/0635 705/7.28 |
| 2017/0346824 A1 * | 11/2017 | Mahabir | ................. | H04L 63/10 |
| 2018/0068241 A1 * | 3/2018 | Varkey | ............... | G06Q 10/0635 |

* cited by examiner

*Primary Examiner* — Alexey Shmatov
*Assistant Examiner* — Hansol Doh
(74) *Attorney, Agent, or Firm* — Ellenoff Grossman & Schole LLP; James M. Smedley; Alex Korona

(57) ABSTRACT

Embodiments of the present invention are generally directed towards providing systems and methods for providing risk recommendation, mitigation and prediction. In particular, embodiments of the present invention are configured to allow for input of data related to known hazards to be interpreted and tracked or estimation of risk present in a variety of scenarios. Further embodiments of the present invention are configured to allow for predictive modeling and analysis of risk based on data as well as predictive behavior and other modeled information.

19 Claims, 7 Drawing Sheets

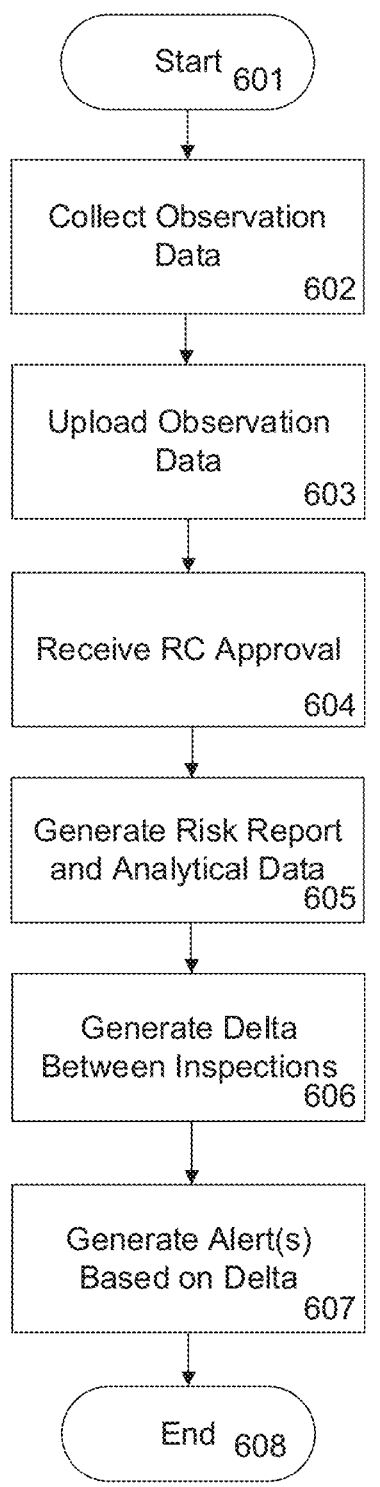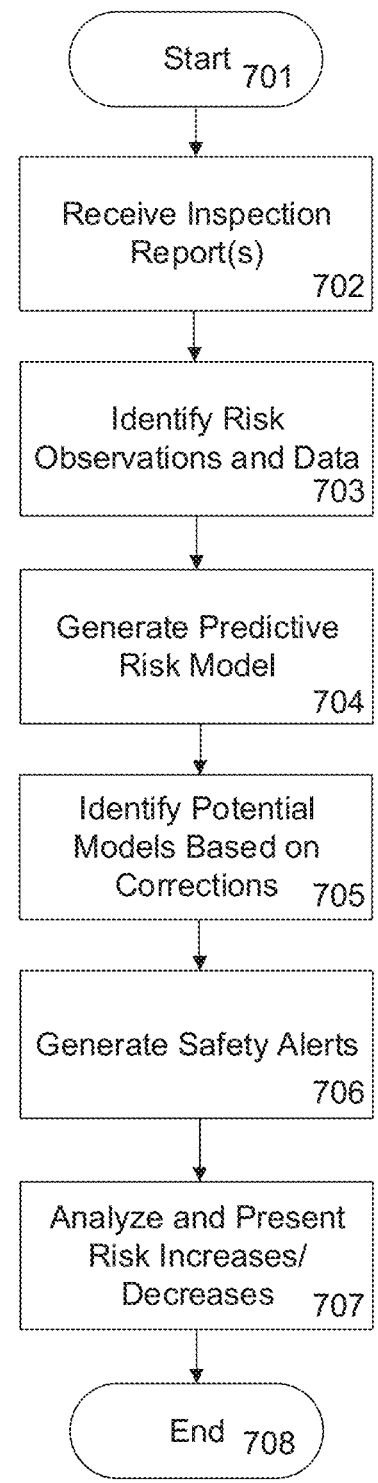
FIG. 6
FIG. 7

SYSTEM AND METHOD FOR PROVIDING RISK RECOMMENDATION, MITIGATION AND PREDICTION

FIELD OF THE INVENTION

Embodiments of the present invention are generally directed towards providing systems and methods for providing risk recommendation, mitigation and prediction. In particular, embodiments of the present invention are configured to allow for input of data related to known hazards to be interpreted and tracked or estimation of risk present in a variety of scenarios. Further embodiments of the present invention are configured to allow for predictive modeling and analysis of risk based on data as well as predictive behavior and other modeled information.

BACKGROUND

Major construction projects are almost always insured by large insurance companies, providing policies that cover the potential casualty and loss of a portion or a whole of an entire project. These policies can extend into the hundreds of millions of dollars or more. In order to analyze the risk and reduce the chance of large payouts on projects, these insurance companies utilize risk engineers to analyze risks at project sites and provide recommendations to the insured on how to reduce overall risk for the project.

Risk Management is one of the key aspect for all insurers, re-insurers and insurance brokers, and many companies in the insurance industry have internal resources with specialist knowledge, such as Bridge Engineers, Mechanical Engineers, Chemical Engineers, Chartered Surveyors and Fire Engineers (collectively known as Risk Engineers) these Risk Engineers conduct regular inspections of insurance portfolios of either operational property or projects undergoing construction, with the primary purpose to prevent losses by examining the performance and identifying key areas of risk, providing risk improvement recommendations, analyzing losses and sharing lessons learnt with the teams.

However, currently, even though there are huge amounts of capital on the line for each project, there are few, if any, ways for the insurance companies to track and ensure that insured parties comply with these recommendations or otherwise take actions to reduce risk. It is extremely difficult to track the status of the improvements, since once issued, the only way to ensure they are formally completed is to have the broker contact the site or plant manager to send the response, with validation of compliance. This is very time consuming and sometimes frustrating for the site teams, whom often do not understand the insurance protocols. As such, even where recommendations are made, they can go unattended for long periods without being addressed, leaving open the potential for an increased chance of loss. In many cases, the improvements are not actioned by the insured in a timely manner, leaving a risk exposed to potential claims that could cost insurers millions of dollars.

Further, since there are numerous parties involved in the project and risk analysis of a project, there are several moving parts, all with little or no formal method for tracking or monitoring actions and communications between the parties. Information given from the risk engineer to the insurance company might not make it to the broker; information from the insured to the broker may not make it to the risk engineer; and so on and so forth.

Finally, given the amount of data associated with these projects that is potentially available, but not utilized, there are several areas where communication, analytics and analysis could all be improved in order to provide a robust solution and reduce overall risk of loss on these projects.

Therefore, there is need in the art for systems and methods for providing risk recommendation, mitigation and prediction in order to provide accurate assessments of risk for various projects as well as provide predictive analytics for those involved in risk assessment and management. These and other features and advantages of the present invention will be explained and will become obvious to one skilled in the art through the summary of the invention that follows.

SUMMARY OF THE INVENTION

Accordingly, it is an aspect of the present invention to provide systems and methods providing risk recommendation, mitigation and prediction in order to provide accurate assessments of risk for various projects as well as provide predictive analytics for those involved in risk assessment and management.

According to an embodiment of the present invention, a computerized system for risk recommendation, mitigation and prediction comprises: a risk analysis and analytics engine, comprising computer-executable code stored in non-volatile memory; a processor; and a communications means, wherein said risk analysis and analytics engine, said processor and said communications means are operably connected and are configured to: receive one or more risk recommendations from a user via said communications means, wherein each risk recommendation of said one or more risk recommendations comprise information related to at least one risk element; correlate each of said one or more risk recommendations with a risk type; generate, via said processor, a risk analysis of risk associated with unattended items in said one or more risk recommendations; and transmit risk analysis to one or more third parties via said communications means.

According to an embodiment of the present invention, said risk analysis and analytics engine, said processor and said communications means are further configured to receive an update, wherein said update changes the status of one or more unattended items to attended.

According to an embodiment of the present invention, said risk analysis and analytics engine, said processor and said communications means are further configured to generate an updated risk analysis based on said update, wherein said updated risk analysis changes a probability of a risk event occurring.

According to an embodiment of the present invention, said risk analysis comprises probabilities of one or more risk events occurring.

According to an embodiment of the present invention, each of said one or more risk events comprise an event type.

According to an embodiment of the present invention, said risk analysis and analytics engine, said processor and said communications means are further configured to associate loss ratios with said risk type.

According to an embodiment of the present invention, said risk analysis and analytics engine, said processor and said communications means are further configured to: receive observation data, via a communications means, wherein said observation data is associated with one or more of said one or more risk recommendations; receive approval for said observation data; and generate a predictive model for risk occurrence across a time period occurring in the future.

According to an embodiment of the present invention, said risk analysis and analytics engine, said processor and said communications means are further configured to: receive updated inspection information associated with said one or more risk recommendations; generate updated risk analysis from said updated inspection information; and generate delta between said predictive model for risk occurrence and said updated risk analysis.

According to an embodiment of the present invention, said risk analysis and analytics engine, said processor and said communications means are further configured to generate an alert based on said delta, wherein said delta exceeds a threshold for expected risk.

According to an embodiment of the present invention, said risk analysis and analytics engine, said processor and said communications means are further configured to: receive a personnel assignment; identify location of said personnel assignment; identify one or more secondary projects in the vicinity of said location; present option to the user to accept assignment of one or more of said one or more secondary projects; confirm assignment of one or more of said one or more secondary projects; and assign said one or more of said one or more secondary projects to said user.

According to an embodiment of the present invention, a method for risk recommendation, mitigation and prediction comprises the steps of: receiving one or more risk recommendations from a user via a communications means, wherein each risk recommendation of said one or more risk recommendations comprise information related to at least one risk element; correlating each of said one or more risk recommendations with a risk type; generating, via a processor, a risk analysis of risk associated with unattended items in said one or more risk recommendations; and transmitting risk analysis to one or more third parties via said communications means.

According to an embodiment of the present invention, the method further comprises the step of receiving an update, wherein said update changes the status of one or more unattended items to attended.

According to an embodiment of the present invention, the method further comprises the step of generating an updated risk analysis based on said update, wherein said updated risk analysis changes a probability of a risk event occurring.

According to an embodiment of the present invention, the method further comprises the step of associating loss ratios with said risk type.

According to an embodiment of the present invention, the method further comprises the steps of receiving observation data, via a communications means, wherein said observation data is associated with one or more of said one or more risk recommendations; receiving approval for said observation data; and generating a predictive model for risk occurrence across a time period occurring in the future.

According to an embodiment of the present invention, the method further comprises the steps of receiving updated inspection information associated with said one or more risk recommendations; generating updated risk analysis from said updated inspection information; and generating delta between said predictive model for risk occurrence and said updated risk analysis.

According to an embodiment of the present invention, the method further comprises the step of generating an alert based on said delta, wherein said delta exceeds a threshold for expected risk.

According to an embodiment of the present invention, the method further comprises the steps of: receiving a personnel assignment; identifying location of said personnel assignment; identifying one or more secondary projects in the vicinity of said location; presenting option to the user to accept assignment of one or more of said one or more secondary projects; confirming assignment of one or more of said one or more secondary projects; and assign said one or more of said one or more secondary projects to said user.

BRIEF DESCRIPTION OF THE DRAWINGS

FIG. 6 is a process flow of an exemplary method in accordance with embodiments of the present invention;

FIG. 7 is a process flow of an exemplary method in accordance with embodiments of the present invention.

DETAILED SPECIFICATION

Figure 1:
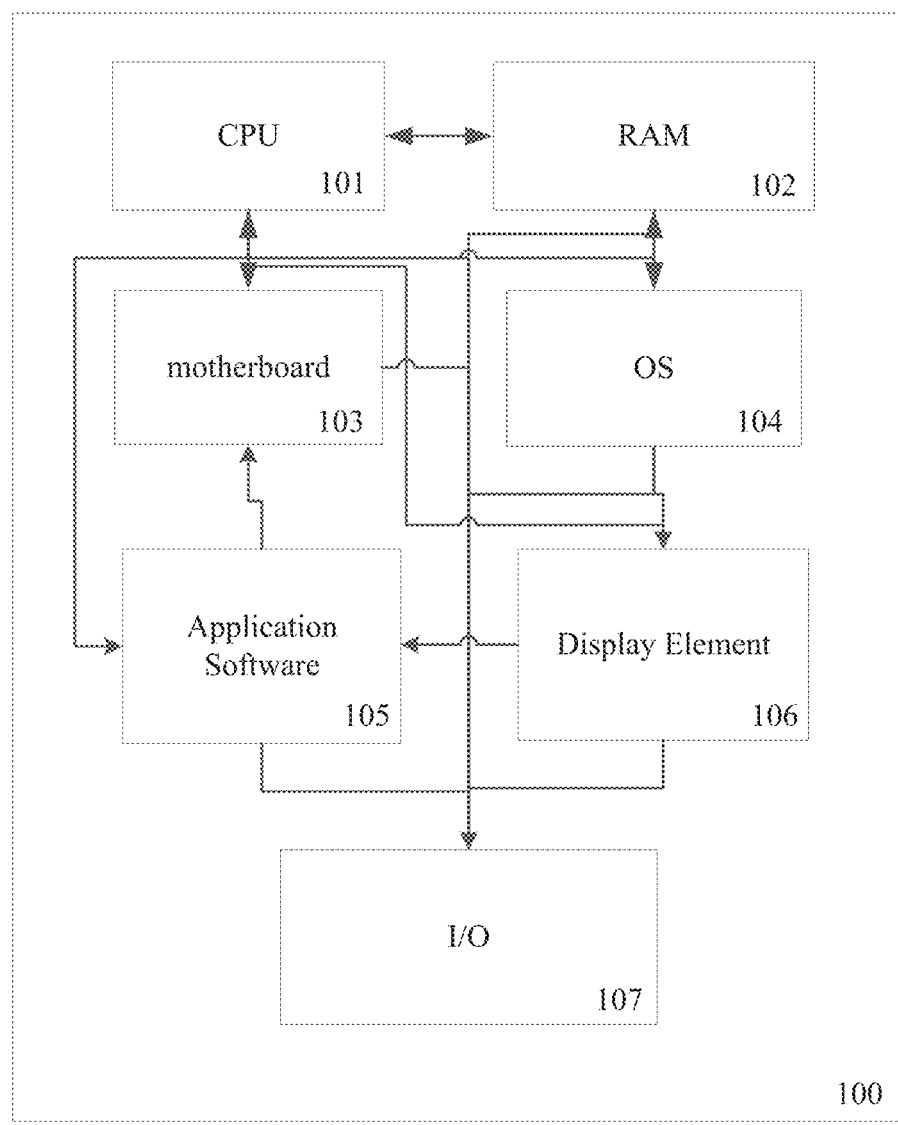
FIG. 1 illustrates a schematic overview of a computing device, in accordance with an embodiment of the present invention.

According to an embodiment of the present invention, the systems and methods described herein are configured for providing risk recommendation, mitigation and prediction. In particular, embodiments of the present invention are configured to allow for input of data related to known hazards to be interpreted and tracked or estimation of risk present in a variety of scenarios. Further embodiments of the present invention are configured to allow for predictive modeling and analysis of risk based on data as well as predictive behavior and other modeled information.

In particular, embodiments of the present invention are configured to provide an interactive project management, workflow system and risk recommendation tracker. Preferred embodiments of the present invention are contemplated for use in the insurance industry, but those of ordinary skill in the art would appreciate that embodiments of the present invention may be utilized in other industries as well.

It is one aspect of embodiments of the present invention to allow users (e.g., insurance companies) to enter and track various projects (e.g., commercial construction projects) and take various actions on such projects, such as issue new instructions, track statuses of projects and track statuses of various recommendations issued to those associated with the projects (e.g., insured party). Further, preferred embodiments of the present invention are configured to issue automated messages, badges and alerts to various users related to risk items as they arise. Finally, embodiments of the present invention are contemplated to act as a global risk analytic source for data entered, processed and generated by the system, allowing for preemptive and predictive modeling of risk.

In order to achieve these functional aspects, embodiments of the present invention are configured to provide metered access to various portions of the system based on role (e.g., insurance company user, risk engineer user, insured user, insurance broker user), with each role being provided a graphical user experience based on that role.

For instance, insurance companies may be provided information relevant specifically to the insurance company. Since an insurance company could have several hundred insured projects open at any given time, it becomes difficult to monitor each individually. Embodiments of the present invention provide a graphical user dashboard to such insurance companies that displays analytical data for these projects in an aggregated format that can be drilled down into upon interaction with the user interfaces by the users. Drilling down, the user can view data as granular as a single project, or even a single risk inspection report, but can abstract out to levels including data across specific project types (e.g., residential construction, mining), or even all projects as a whole, with data being provided at each level on a specific or aggregate level. Further, the user can see what other users (e.g., risk engineers, insured, contractors, brokers) are assigned to various projects, and who owes action items on the various projects (e.g., risk engineer owes inspection report). The user could also be provided information about unassigned projects and available assets that could be assigned to the project. One of ordinary skill in the art would appreciate that there are numerous types of data that could be provided to users, and embodiments of the present invention are contemplated for use with any type of data.

According to an embodiment of the present invention, information that is relevant to insured, risk engineers, or other types of users may be similarly cordoned off. This allows for the protection of proprietary, confidential, privacy and other types of data, as various users may be working for various other entities and in order to protect the data, access is therefore limited.

According to an embodiment of the present invention, the system is configured to provide certain classes of users the ability to collect and provide data to the system related to surveys and recommendations. Specifically, embodiments of the present invention are configured to allow risk engineers and other personnel to capture data about specific project risks (i.e., risk elements) (e.g., flood, fire, collapse, health and safety, security) and provide specific recommendations about how such risks could be addressed or mitigated. Data about the specific risks may be captured, for instance, via a mobile computing device operated by a user on a project site and uploaded to the system for use in generating reports and other actions. For instance, a risk engineer could capture images, video, audio, and insert textual data about specific risks on a project via a mobile computing device and upload the information to the system via a communications means. The data may include not only information about the risk, but also provide specific recommendations for reducing or otherwise mitigating the risk.

In certain embodiments of the present invention, when a risk engineer uploads data about a specific risk, that data (i.e., observation data) may first require approval from a risk engineer company or other administrator before being processed. This allows for continuity of data and a second check for appropriateness of specific observation data. The administrator can alter, amend or otherwise change the observation data or recommendation before approving the data for release to other parties (e.g., insured, insurance company).

According to an embodiment of the present invention, once released, the other users have access to the information and may delve into the recommendations. Further, the system will process the released data in an individual and aggregate manner.

On the individual level, the system will process the risk information to identify a risk type and also correlate the risk type with other potential risks that may have not been identified by the risk engineer. This can be done by leveraging historical data and training data available to the system, whereby the system can analyze patterns in risk types previously resulting in a loss event in order to predict whether individual risks identified in an inspection or other report would likely result in a loss, or potentially create other risk types based on other information known to the system about specific projects (e.g., projects in certain areas more frequently utilize wooden framing compared with those in other locations, a function of which will increase risk of fire in comparison to those projects not utilizing wooden framing).

On the aggregate level, the system can provide information to users about loss and loss ratios for specific risk types. This allows users to know how significant loss is for each type of risk, and how small moves in the likelihood of an event occurring in a specific risk type can impact the potential loss amount for specific projects.

Further, the system can use the aggregate data to provide core predictive modeling. By knowing what has occurred in the past, across all projects, the system can begin to predict loss occurrences in future projects and how taking specific risk mitigation actions can reduce or eliminate these loss events. The predictive modeling methods provided by the system may include generating predicted risk levels for one or more risk types for the entire life cycle of a project. This may be done, for instance, by taking a baseline risk analysis from information known about the project, one or more past inspections, or any combination thereof. From there, the system can generate a timeline of expected risk levels for each type of risk associated with a project. Types of risk include, but are not limited to, fire, flood, water damage, impact, natural perils, collapse, explosion, health and safety, quality procedure, quality assurance, security or any combination thereof. One of ordinary skill in the art would appreciate that there are numerous types of risk types that could be utilized by the system, and embodiments of the present invention are contemplated for use with any type of risk type.

According to an embodiment of the present invention, the predictive modeling of future risk levels can further be used to identify and monitor changes in the risk levels that exceed acceptable thresholds. In one embodiments, predictive models of future risk can be used to generate alarms or events where thresholds of risk of one or more types are exceeded. In other embodiments, the predictive risk levels can be compared with updated inspection reports as they are completed and unfavorable deltas between the predicted risk level and actual risk level may be used to generate alarms or events where the delta exceeds certain thresholds (e.g., predicted risk <=0.05%, actual risk after inspection=1.0%, threshold of delta >=0.02%=generate alarm/event). In this manner, the system can be leveraged by users to identify potential risks or unacceptable levels of risk that might not otherwise be apparent on their face.

According to an embodiment of the present invention, the system may further be configured to generate safety alerts or alarms to one or more projects based on loss experiences in similar projects. For instance, if there are multiple generator fires caused by a specific type of generator, other projects with the same model or type of generator on site could be warned of potential fire hazards associated with that generator. Project alerts can be identified and based on any number of characteristics, such as project type (e.g., mining, construction, drilling), project location, project size, project characteristics (e.g., timber framing v. concrete framing, project size), or any combination thereof. One of ordinary skill in the art would appreciate that there are numerous types of characteristics that could be used in conjunction with embodiments of the present invention, and embodiments of the present invention are contemplated for use with any appropriate project type.

According to an embodiment of the present invention, the alerts/events that may be generated by the system are provided to the appropriate users of the system in any number of ways. In a preferred embodiment of the present invention, the alerts or events will be provided to users via communications with one or more computing devices associated with the users. The alerts/events will generally comprise information related to the type of risk that caused the alert/event. In preferred embodiments, the information provided to the user will comprises one or more of the type of risk, the severity of the risk, summary of corrective actions that could be taken, risk of loss, estimated value of loss if an event were to occur on the identified risk, or any combination thereof. One of ordinary skill in the art would appreciate that there are numerous types of information that could be included in the event/alert, and embodiments of the present invention are contemplated for use with any type of information. The alerts/events may be provided to the users through one or more delivery methods, such as, but not limited to, SMS, email, notification on a mobile device via an installed application, via a messaging application, or any combination thereof. There are numerous notification types that one of ordinary skill in the art would appreciate could be used with embodiments of the present invention, and all notification types are contemplated for use with embodiments of the present invention.

According to certain embodiments of the present invention, alerts/events can be generated for uncorrected items that have been identified in inspection reports. In certain cases, not attending to items causing risk may result in the termination or non-honoring of a policy by an insurance company. The system can be configured to alert insured that uncorrected items that have not been addressed may result in the termination or other ramification of a policy.

Returning to predictive and actual modeling of risk, the system may further be configured to receive updates from users, such as insured personnel or their employees, related to corrective actions taken on risk recommendations previously provided to the system. By completing corrective actions, risks will ultimately be reduced, and the system can take information related to corrective actions taken and recalculate risk based on the performance of such actions. In certain embodiments, before the system reanalyzes the risk of a project based corrective actions, the system may first require a risk engineer or associated company to approve the information provided by the user to ensure that the corrective action taken was in line with the recommendation provided by the risk engineer.

In certain embodiments, recalculated risk based on corrective actions taken by the system can be taken into account during the predictive modeling analysis performed by the system. In preferred embodiments, corrective actions taken by users may be weighted less than actual risk inspections completed by risk engineers. This is because not all corrective actions are made permanent or done in a manner that does not increase risk elsewhere. Upon a follow up inspection by a risk engineer, the corrective actions can be confirmed as either completed correctly, completed partially, or not completed at all, or any combination thereof. Therefore, predictive modeling based on uninspected corrective actions may be weighted with a slightly or moderately higher residual risk than those which have been inspected again on a follow up inspection and confirmed by the risk engineer. Historical and training data may be used to analyze and provide the delta between the residual risks associated with corrected, but uninspected actions versus corrected and inspected actions.

According to an embodiment of the present invention, the system can use all or a portion of the aggregated data about risk and loss to create a deeply integrated and informed analytical processing model, whereby risk can be associated on a very granular level, such as associating risk types and loss types and ratios with very specific metrics, such as specific risk types, with specific project types, in specific project locations. Using this large set of data, the system can predict very accurately the potential for loss at any given project.

According to a preferred embodiment of the present invention, additional tools are provided by the system to risk engineers for the performance of their inspection duties. In these preferred embodiments, the system provides risk engineers a secure system where access to all documents necessary to perform an inspection are provided to their computing device (e.g., mobile computing device such as a smartphone or tablet PC).

In certain embodiments, the system may be configured to provide risk engineers with a hazard map overlay for the site address for a project. A hazard map shows potential area hazards for a project site. Hazards shown on a hazard map may include, but are not limited to, flood areas, proximity to airports, proximity to bodies of water, proximities to other potential natural disaster areas (e.g., tornado zones, hurricane zones, volcanoes), or any combination thereof. One of ordinary skill in the art would appreciate that there are numerous types of hazards that could be provided on a hazard map overlay, and embodiments of the present invention are contemplated for use with any appropriate hazard. These hazard map overlays assist in risk assessment by a risk engineer as various hazards may require attention when calculating particular risks.

In certain embodiments, the system may be configured to provide risk engineers with the ability to conduct a closeout meeting via a mobile or other computing device. A closeout meeting is generally required at the end of an inspection to ensure that other appropriate users (e.g., broker, project manager, insured personnel) are present and received information associated with the various risks and potentially corrective measures to be taken and the severity of each (e.g., immediate, urgent, routine, advisory and best practice). In certain embodiments, where each of the other users is also provided access to the system, the system may provide a method whereby the risk engineer can engage a closeout meeting notification, and each user present may confirm their attendance via their own computing device or by engaging through another means, such as confirming via the risk engineer's computing device, via link in an email or SMS message, or other means for confirming attendance. In this manner, particularly where the users all confirm via their own computing devices, an electronic handshake can be created and all users can be verified by unique identifiers and validated that they were in attendance. Advantageously, this ensures that users cannot later deny that they were presented with the specific recommendations and necessary corrective actions, further reducing risk liability for the insurer.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage) 103, an operating system (OS) 104, one or more application software 105, one or more programming languages 106 and one or more input/output devices/means 107. Examples of computing devices usable with embodiments of the present invention include, but are not limited to, personal computers, smart phones, laptops, mobile computing devices and tablet PCs and servers. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
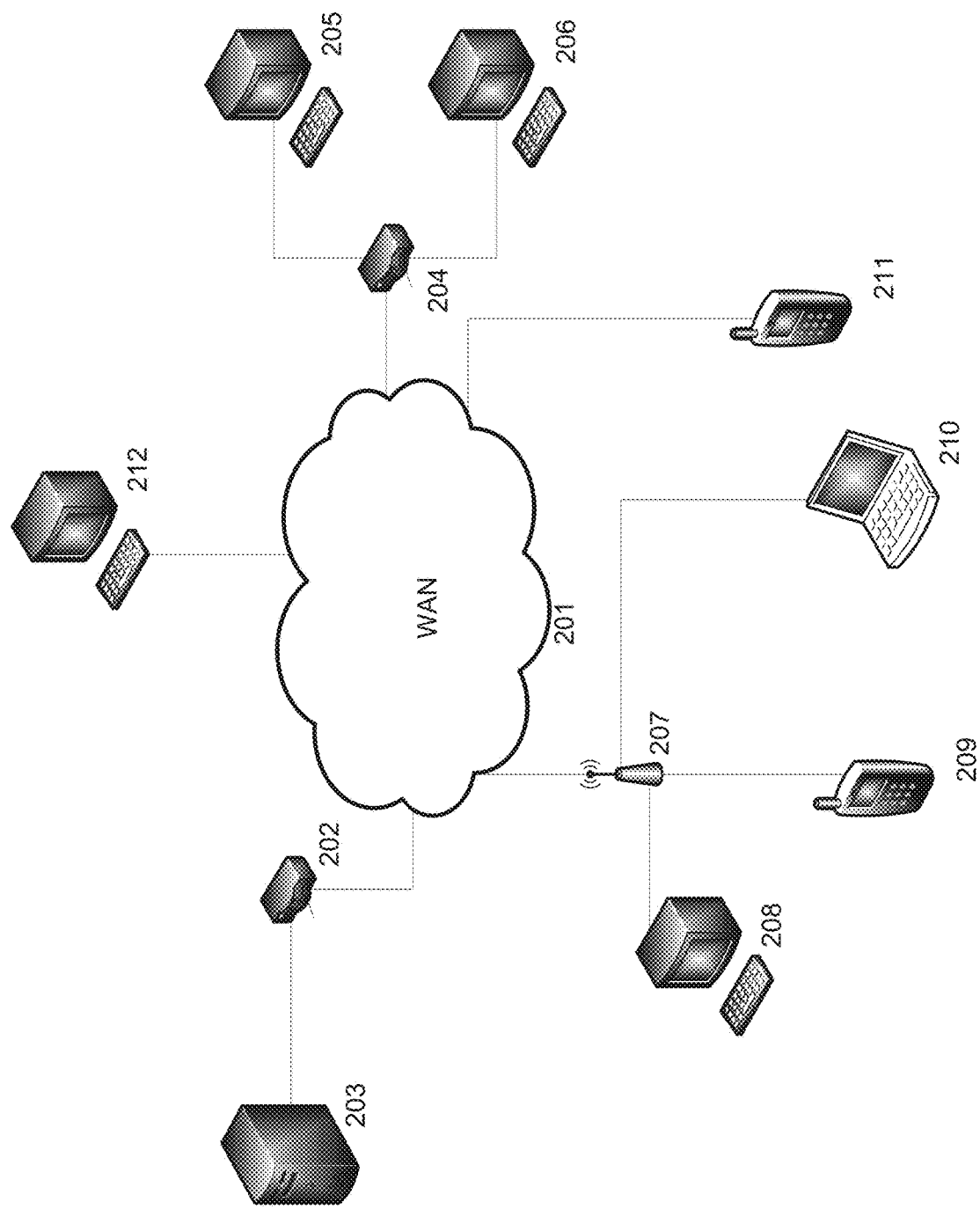
FIG. 2 illustrates a network schematic of a system, in accordance with an embodiment of the present invention.

Referring to FIG. 2, a schematic overview of a system in accordance with an embodiment of the present invention is shown. The system is comprised of one or more application servers 203 for electronically storing information used by the system. Applications in the application server 203 may retrieve and manipulate information in storage devices and exchange information through a Network 201 (e.g., the Internet, a LAN, WiFi, Bluetooth, etc.). Applications in server 203 may also be used to manipulate information stored remotely and process and analyze data stored remotely across a Network 201 (e.g., the Internet, a LAN, WiFi, Bluetooth, etc.).

According to an exemplary embodiment, as shown in FIG. 2, exchange of information through the Network 201 may occur through one or more high speed connections. In some cases, high speed connections may be over-the-air (OTA), passed through networked systems, directly connected to one or more Networks 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to Network 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via Network 201 or other network in numerous ways. For instance, a component may connect to the system i) through a computing device 212 directly connected to the Network 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the Network 201. One of ordinary skill in the art would appreciate that there are numerous ways that a component may connect to server 203 via Network 201, and embodiments of the present invention are contemplated for use with any method for connecting to server 203 via Network 201. Furthermore, server 203 could be comprised of a personal computing device, such as a smartphone, acting as a host for other computing devices to connect to.

Figure 3:
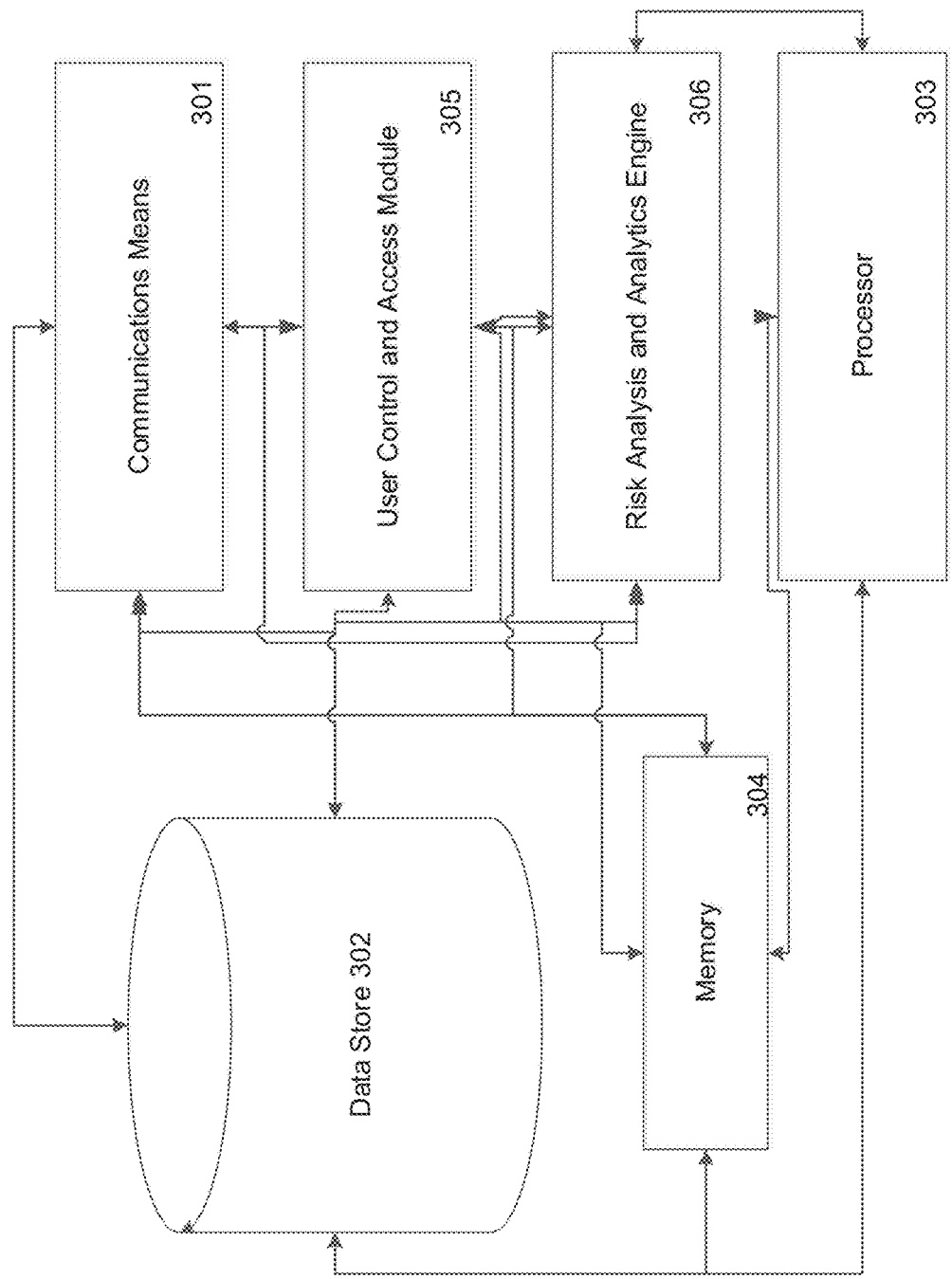
FIG. 3 illustrates a schematic of a system for providing risk recommendation, mitigation and prediction, in accordance with an embodiment of the present invention.
Figure 4:
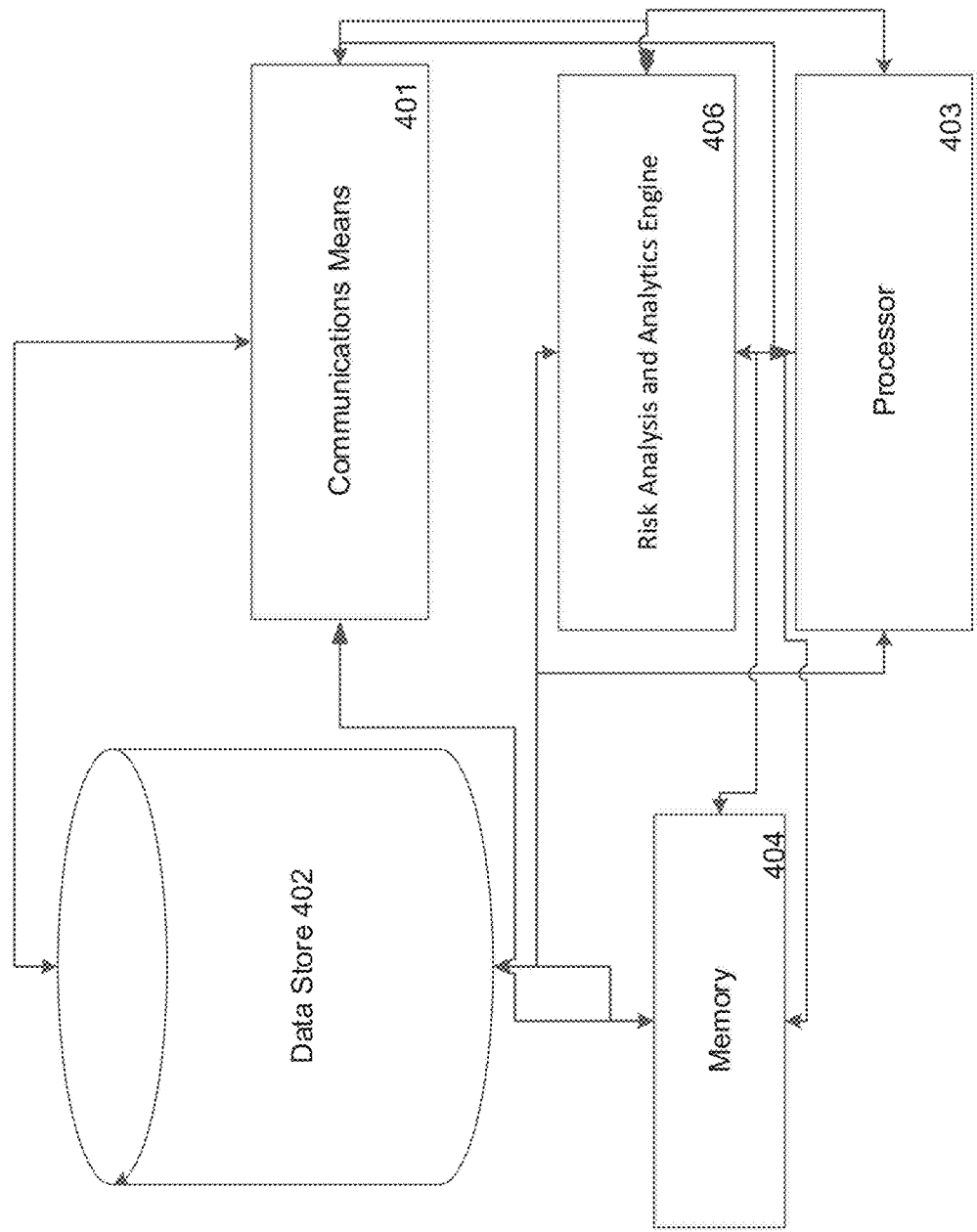
FIG. 4 illustrates a schematic of a system for providing risk recommendation, mitigation and prediction, in accordance with an embodiment of the present invention.

Turning to FIG. 3, according to an embodiment of the present invention, a system for providing automated keychain grouping and updating is comprised of one or more communications means 301, one or more data stores 302, a processor 303, memory 304, a user control and access module 305 and a risk analysis and analytics engine 306. In FIG. 4B, according to an embodiment of the present invention, a system for providing automated keychain grouping and updating is comprised of one or more communications means 401, one or more data stores 402, a processor 403, memory 404 and a risk analysis and analytics engine 406. In alternate embodiments, the system may have additional or fewer components. One of ordinary skill in the art would appreciate that the system may be operable with a number of optional components, and embodiments of the present invention are contemplated for use with any such optional component.

According to an embodiment of the present invention, the communications means of the system may be, for instance, circuitry purposed for the means of communicating data over one or more networks or to one or more peripheral devices attached to the system. Appropriate communications means may include, but are not limited to, circuitry and or other electronics or combinations of software, hardware and individual elements thereof, each providing for one or more wireless connections, wired connections, cellular connections, data port connections, Bluetooth connections, fiber optic connections, modems, network interface cards or any combination thereof. One of ordinary skill in the art would appreciate that there are numerous communications means that may be utilized with embodiments of the present invention, and embodiments of the present invention are contemplated for use with any communications means.

According to an embodiment of the present invention, the user control and access module provides security, control and access to various aspects of the system. Since the system provides elements to users of various types, the user control and access module ensures that each user type is provided a user experience that is tailored to their specific roles. As such, preferred embodiments of the user control and access module may be configured with multiple portals, one for each type of user.

In a preferred embodiment of the present invention, each of the various user types is provided with a unique dashboard, comprising a graphical user interface that provides data specific to their needs. For instance, in a preferred embodiment of the present invention, the user control and access module may be configured to provide an insurance company portal, insurance broker portal, external/internal risk engineering company portal, risk engineer portal, insured—risk manager portal, and insured—respondent portal. One of ordinary skill in the art would appreciate that the system could provide additional or fewer portals, and embodiments of the present invention are contemplated for use with any number of portals.

According to an embodiment of the present invention, an insurance company portal may provide a dashboard and other components for display of projects and project data, project allocation tools, financial information (e.g., project financials, risk inspection financial information), risk recommendations, risk analysis and reports, and any combination thereof. One of ordinary skill in the art would appreciate that there are numerous types of information that could be displayed on the insurance company portal, and embodiments of the present invention are contemplated for use with any appropriate information.

According to an embodiment of the present invention, an insurance broker portal is configured to provide insurance brokers a dashboard which provides access to data relevant to their needs for various projects. Since the broker acts as a conduit between the insurance company and the insured, the data provided on the dashboard will be relevant to these purpose. One of ordinary skill in the art would appreciate that there are numerous types of information that could be displayed on the insurance broker portal, and embodiments of the present invention are contemplated for use with any appropriate information.

According to an embodiment of the present invention, external/internal risk engineering company portals may provide the risk engineers and their company specific information related to projects, inspections, risk analysis, risk events and other important aspects of a project that may be required to generate and process data associated with these projects. One of ordinary skill in the art would appreciate that there are numerous types of information that could be displayed on the external/internal risk engineering company portals, and embodiments of the present invention are contemplated for use with any appropriate information.

According to an embodiment of the present invention, an insured's risk manager portal and respondent portal may be configured to provide a dashboard that comprises information about recommendations for risk mitigation and other corrective actions that are identified by the risk engineer and insurance company. Other data may include policy information, project information, and other relevant data. One of ordinary skill in the art would appreciate that there are numerous types of information that could be displayed on the insured's risk manager portal and respondent portals, and embodiments of the present invention are contemplated for use with any appropriate information.

According to an embodiment of the present invention, the risk analysis and analytics module is configured to process risk data and observation data in order to generate the analytics and reports described elsewhere herein. In preferred embodiments of the present invention, the risk analysis and analytics module is configured to receive information from users, retrieve information from storage and other data sources, and use this information to generate reports, analytics, events and alerts for various risks. The types of data processed, events and analysis created and other aspects are detailed throughout this detailed description.

According to an embodiment of the present invention, the risk analysis and analytics module may further be configured to generate reports automatically, based on information provided by a user, such as a risk engineer. Given that the system can identify risk types and risk elements, the system can further use artificial intelligence and other means to automatically generate reports, based on specific risk types and elements. For instance, if a user enters information related to a fire risk, based on a flammable gas tank being secured to a structural support of a building, the system can identify the risk type (e.g., fire) and element (e.g., tethered flammable gas tank) and generate a recommendation for mitigating this risk (e.g., untether tank and move tank to a minimum specific distance from the structure) as well as automatically assign a risk level associated with the specific recommendation. Through use of a combination of artificial intelligence, supported with training data and other risk model information, the system may be configured to automatically generate the reports from inputs provided by the user, thereby reducing the time to generate a report from weeks to mere days or even instantaneously, depending on how detailed the input from the user is.

Exemplary Embodiments

Figure 5:
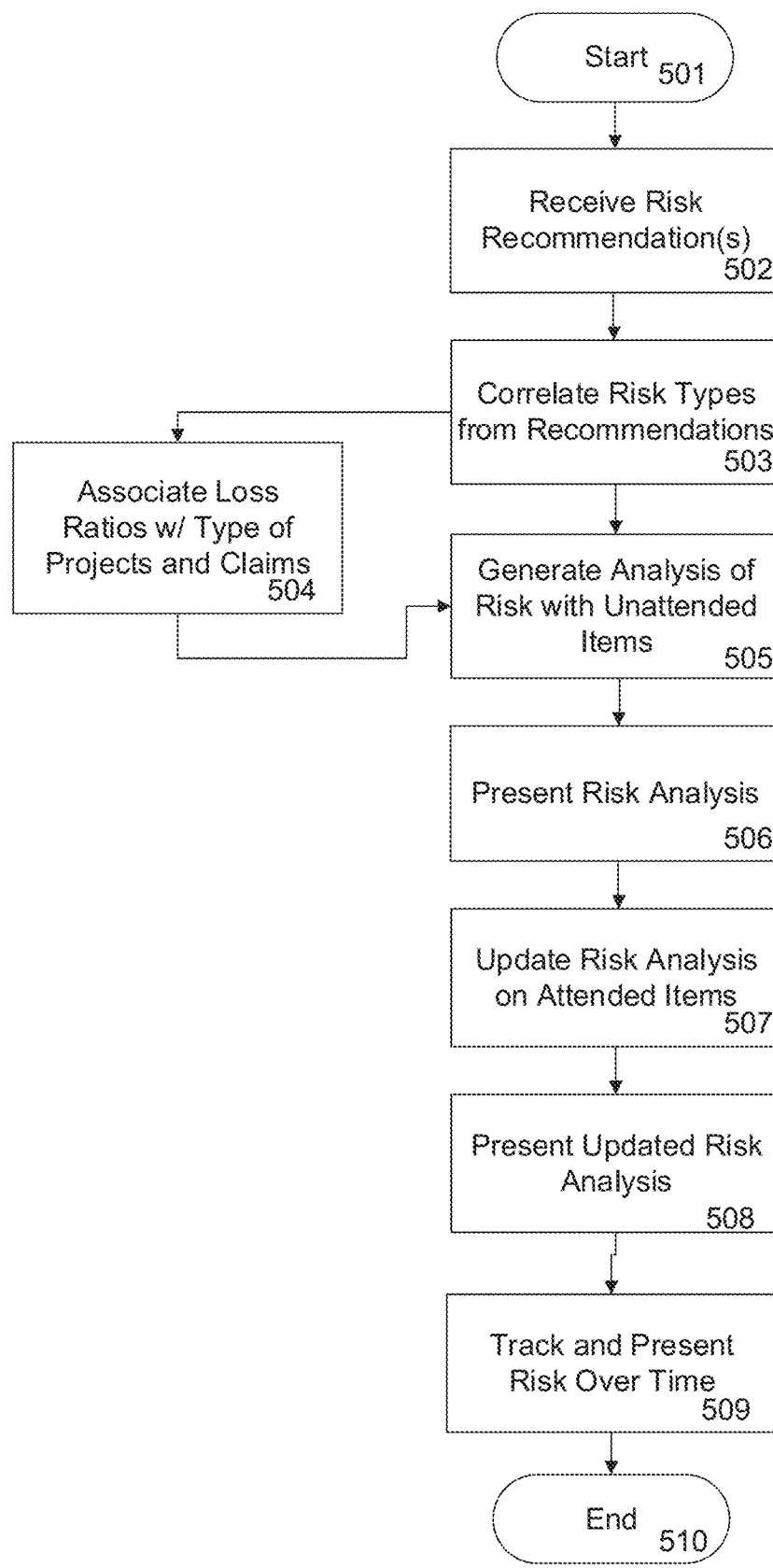
FIG. 5 is a process flow of an exemplary method in accordance with embodiments of the present invention.

Turning now to FIG. 5, an exemplary method for providing risk recommendation, mitigation and prediction is shown. The process starts at step 501 with the system being communicated with by one or more users. At step 502, the system receives one or more risk recommendations from a computing device operated by the user. In a preferred embodiment, the risk recommendations are in line with what has been previously discussed herein. The system will parse the risk recommendations into individual risk elements in order to identify and classify the risk(s).

At step 503, the system correlates risk types from the recommendations, as parsed into individual risk elements. In this step, the correlation of risk types is accomplished by associating various risk elements and recommendations with various risk types. Using trained data, the system may automatically identify and associate the risk recommendation and risk elements with the types of risk associated with those recommendations and elements.

Optionally, at step 504, the system uses the correlated risk types to identify and associate loss ratios with risk types of similar types of projects and claims. Utilizing historical or other data, the system can associate each risk recommendation, risk element and risk type with a ratio of loss associated with those recommendations, elements and types based on the type of project and claims made for loss on those projects where similar risks were present or otherwise identified.

At step 505, once the risk types have been correlated, and optionally the loss ratios associated, the system generates an analysis of risk for the project in relation to the unattended items. In this, the system projects the overall risk for the project, based on the identified risk types and risk recommendations. Given data available to the system, the system can project the potential risk for the entire project across the various types of hazards and provide an overall analysis of the potential risk.

At step 506, the system transmits the risk analysis to one or more users. This is generally done by way of a communications means transmitting data to be processed on one or more computing devices associated with the one or more users. However, one of ordinary skill in the art would appreciate that there are numerous methods for transmitting data to users for consumption on a computing device.

At step 507, the system receives and processes updates on the identified risks. Updates generally include, but are not limited to, information associated with corrective action taken on a identified risk. Given that corrective actions will affect the overall risk analysis, the system will regenerate the risk analysis after a corrective action is taken. Further, failure to provide corrective action over a period of time could also result in inherently increased risk, such as not correcting issues they will inherently cause increased risk over time, such as leaking water pipes or failing/poorly maintained equipment.

At step 508, the updated risk analysis is presented to the user(s). This process is repeated for so long as the risk is being tracked for a project (step 509) and once complete, the process terminates at step 510.

Turning now to FIG. 6, an exemplary method for providing risk recommendation, mitigation and prediction is shown. The process starts at step 601 with the system being communicated with by one or more users. In particular, the method shown in FIG. 6 is directed to a process for collecting and processing risk analysis data from inspections. At step 602, observation data is collected from a project site via a computing device operated by a user. In a preferred embodiment, the observation data may be comprised of one or more of text entered by the user, pictures or videos taken by the user, audio recorded by the user, location data provided by the user or by location identification circuitry (e.g., GPS systems) or any combination thereof. One of ordinary skill in the art would appreciate that there are numerous types of observation data that could be collected, and embodiments of the present invention are contemplated for use with any appropriate type of observation data.

At step 603, the user, via the computing device, uploads the observation data to the system for processing. Generally this is accomplished via a communications means, however, one of ordinary skill in the art would appreciate that there are numerous methods for transmitting observation data to the system for processing.

In preferred embodiments of the present invention, once uploaded, a company or other administrator of the onsite engineer or other personnel collecting the observation data oversees and approves (or otherwise disapproves) of the provided observation data. In this step 604, the system provides the observation data to the appropriate administrator for approval. If the observation data is not approved, then the process would terminate at this point for the present piece of observation data. However, assuming the administrator approves of the observation data, the process will continue.

At step 605, once the observation data has been approved, the system will generate a risk report and analytical data related to the observation data. In preferred embodiments of the present invention, the associated risk report is based on the observation data approved by the administrator and provides an analysis of the risk for a project. In general, the analysis of risk is provided in a format as detailed elsewhere herein. For example, the analysis and report of risk may be provided such that various types of risk are broken out and detailed, such that each type of risk is weighed against each other on a statistical probability of an event of that risk type occurring for the given project.

At step 606, where the observation data provided is not the initial risk data provided, the system will generate a delta between one or more inspections. In this manner, the system will track the rise and fall of probability of an event for various risk types. As a project progresses, the types of risk and probability of an event for those types of risk will vary. For instance, initially, the risk of a health and safety even may be relatively low, as the number of personnel on a project may be low, but this risk will rise significantly as the project is staffed with workers, laborers, staff or other personnel.

Based on the delta report from step 606, the system can be configured to monitor the changes in risk for various types over the course of a project. As noted previously, probability of an event for various risk types may rise and fall over a project's lifecycle. However, the rise and fall of risk types is predictable over this time period and when certain types of risk rise beyond assumed parameters, the system may generate an alert on an unexpected rise of certain types (step 607). Upon generating an alert, the system may notify various users of the unexpected change in risk type. For instance, the system may automatically notify project managers, onsite personnel, risk engineers, or the providers of insurance about an unexpected rise in one or more categories. These alerts may help avoid potential risk or loss events by predicting such events and giving the appropriate parties notice of such risk. Further, the system may identify specific corrective actions that could be taken to reduce the risk types that are associated with the generated alerts. For instance, the system could note corrective actions identified by a risk engineer for the specific risk type and provide details of how completion of such corrective actions would result in the risk parameters returning to expected levels. At this point, the process would terminate at step 608.

Turning now to FIG. 7, an exemplary method for providing risk recommendation, mitigation and prediction is shown. The process starts at step 701 with the system being communicated with by one or more users. In particular, the method shown in FIG. 7 is directed to a process for collecting and processing risk analysis data from inspections. At step 702, the system receives one or more inspection reports from a risk engineer. Generally, the inspection report will be provided to the system via a communications means receiving information from a computing device associated with the risk engineer. The inspection reports will generally include information about a specific project, and will include one or more observations and recommendations associated with various types of risks.

At step 703, the system processes the inspection reports and identifies the various risk observations and data associated with the risk observations. Data associated with the risk observations may include photos, videos, audio or other data which would help identify and characterize the risk.

At step 704, the system uses the identified risk observations and data to generate a predictive risk model. A predictive risk model comprises an estimation of what various risk types would presume to be over the course of time in the future. The predictive risk model is generated based on training and historical data available to the system, and may be used to provide a predictive estimated risk analysis for the entire project lifecycle. In this manner, the system can provide to the relevant personnel the potential for various risk types for various stages of a project, given these personnel the ability to analyze these risks and take preventative actions accordingly to mitigate or otherwise reduce various risks.

At step 705, the system can automatically generate and provide risk models to users based on corrective actions taken on various risk types. For instance, the system can automatically analyze the predictive risk model from the previous step and identify risk types that are high or otherwise exceed desirable thresholds. The system can then review the observed data for these risk types and provide recommendations for corrective actions that would reduce these risk types.

At step 706, where there are predictive risk types that exceed thresholds, the system can generate safety alerts for appropriate personnel. In this manner, the system can preemptively provide alerts to users based on predictive risk models in order to reduce risk before the actual risk levels elevate to the point where an actual threshold is exceeded. Advantageously, the system can attempt to begin to reduce risk before it begins to rise. Since many times it is too late to address risk once the threshold is breached, predictive risk mitigation can significantly reduce overall loss and occurrence of events.

At step 707, the system will receive updated inspection reports for a project as additional inspections are performed. Once received, the system will analyze and present risk increases/decreases over time. The system may also be configured to analyze differences between predicted increases and decreases in order to further train the system in future predictive modeling. Analyzing of differences may be more than just raw analysis of increases and decreases, but may also include analyzing corrective actions taken and items that were ignored from previous reports. At this point, the process will terminate at step 708.

Figure 8:
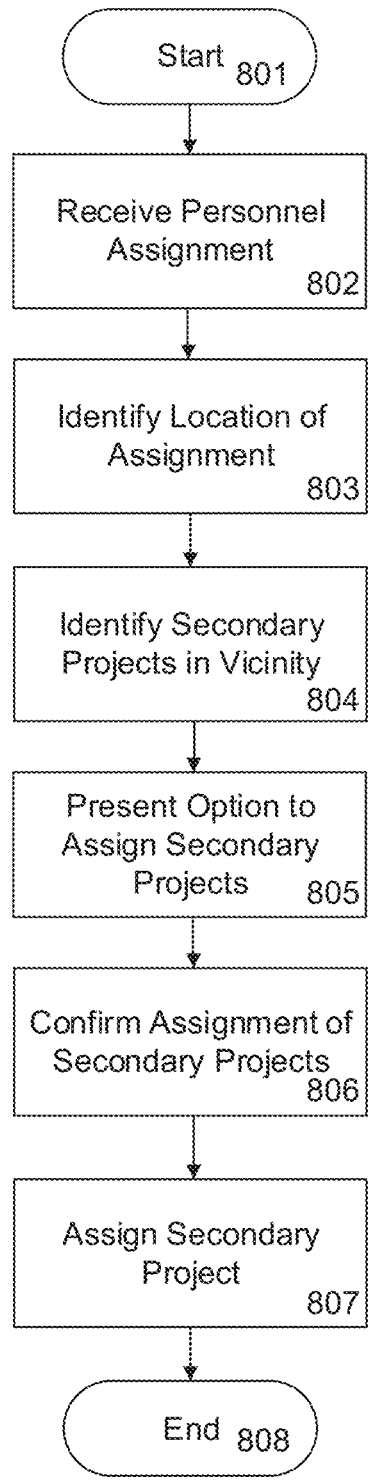
FIG. 8 is a process flow of an exemplary method in accordance with embodiments of the present invention.

Turning now to FIG. 8, an exemplary method for assigning personnel to a project is shown. The process starts at step 801 with the system being communicated with by one or more users. At step 802, the system receives an assignment of personnel to a project. Generally, this will be the assignment of a risk engineer to perform an inspection of a specific project at a specific location.

At step 803, the system identifies the location of the assignment. The location information is retrieved from stored information and provides a geographic location for the specific project/assignment.

At step 804, the system searches stored data for other projects in the geographic location identified in the previous step. Secondary projects in the vicinity with open inspections or other open activities are identified. Secondary projects may also be filtered or narrowed based on other attributes as well, such as specialties/skills required to perform a secondary project. In preferred embodiments, only secondary projects appropriate for the assigned personnel are identified.

At step 805, the system presents options to the assigned personnel to perform additional assignments on the secondary projects identified by the system in the previous step. Since the assigned personnel will already be travelling to the area to perform the principal assignment, these secondary projects would optimize utilization of human resources by eliminating the need to assign different personnel to projects in a specific geographic location (e.g., reducing travel cost, time expenditures, etc).

At step 806, the assigned personnel confirms desire to perform one or more secondary projects. In preferred embodiments, the owner of the secondary project will still need to confirm they approve of the assignment of a secondary project to the assigned personnel. Assuming it is approved, the secondary project is assigned (Step 807). At this point, the process terminates at step 808.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. In a preferred embodiment of the present invention, the data store may be a relational database, working in conjunction with a relational database management system (RDBMS) for receiving, processing and storing data. In the preferred embodiment, the data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A computerized system for project risk mitigation and prediction, the system comprising:
a risk analysis and analytics engine, comprising computer-executable code stored in non-volatile memory;
a processor; and
a communications means,
wherein said risk analysis and analytics engine, said processor and said communications means are operably connected and are configured to:
receive one or more risk mitigation recommendations from each of a plurality of users via said communications means, wherein each risk mitigation recommendation comprises information related to at least one risk element;
aggregate the one or more risk mitigation recommendations;
parse one or more risk elements from the risk mitigation recommendations, and identify one or more risk types based on the parsed out risk elements, wherein each identified risk type has an assigned weight based on its probability of occurrence and an associated loss ratio;
generate a timeline of predicted risk levels for each identified risk type based, at least in part, on its corresponding assigned weight and associated loss ratio, wherein said timeline covers the duration of the project,
calculate a delta between an actual risk level derived from an inspection report of the project and a predicted risk level at the time of the inspection and generate an alarm notification when the delta exceeds a predetermined threshold, wherein said alarm notification comprises the risk type that triggered the alarm notification, the severity of the risk, summary of corrective actions that could be taken, risk of loss, and estimated value of loss if the risk occurs, wherein the actual risk level is reduced upon completion of a corrective action;
generate, via said processor, a hazard map overlay for the project site, wherein the hazard map shows potential area hazards for the project site;
generate, via said processor, a risk analysis of risk associated with unattended mitigation steps in the one or more risk mitigation recommendations and duration of the unattended mitigation steps;
determine overall potential risk for the entire project based on the various risk types and hazards identified, any corrective actions taken, any unattended mitigation steps, and duration of the unattended mitigation steps;
limit access by a user to information received from the user which is related to the risk elements parsed from the risk mitigation recommendations and is proprietary to that user; and transmit via said communications means the generated risk analysis to one or more of the plurality of users including the at least one user to which access was limited.

2. The system of claim 1, wherein said risk analysis and analytics engine, said processor and said communications means are further configured to receive an update, wherein said update changes the status of one or more unattended mitigation steps to attended.

3. The system of claim 2, wherein said risk analysis and analytics engine, said processor and said communications means are further configured to generate an updated risk analysis based on said update, wherein said updated risk analysis changes a probability of a risk event occurring.

4. The system of claim 1, wherein said risk analysis comprises probabilities of one or more risk events occurring.

5. The system of claim 4, wherein each of said one or more risk events comprise an event type.

6. The system of claim 1, wherein said risk analysis and analytics engine, said processor and said communications means are further configured to:
receive observation data, via a communications means, wherein said observation data is associated with one or more of said one or more risk mitigation recommendations;
receive approval for said observation data; and
generate a predictive model for risk occurrence across a time period occurring in the future, wherein the predictive model is generated as a function of the access-limited aggregated one or more risk mitigation recommendations.

7. The system of claim 6, wherein said risk analysis and analytics engine, said processor and said communications means are further configured to:
receive updated inspection information associated with said one or more risk mitigation recommendations;
generate updated risk analysis from said updated inspection information; and
generate delta between said predictive model for risk occurrence and said updated risk analysis.

8. The system of claim 7, wherein said risk analysis and analytics engine, said processor and said communications means are further configured to generate an alert based on said delta when said delta exceeds a threshold for expected risk.

9. The system of claim 1, wherein said risk analysis and analytics engine, said processor and said communications means are further configured to:
receive a personnel assignment;
identify location of said personnel assignment;
identify one or more secondary projects in the vicinity of said location;
present option to the user to accept assignment of one or more of said one or more secondary projects;
confirm assignment of one or more of said one or more secondary projects; and
assign said one or more of said one or more secondary projects to said user.

10. A method for project risk mitigation and prediction, the method comprising the steps of:
receiving one or more risk mitigation recommendations from each of a plurality of users via a communications means, wherein each risk mitigation recommendation comprises information related to at least one risk element;
aggregating the one or more risk mitigation recommendations;
parse one or more risk elements from the risk mitigation recommendations, and identify one or more risk types based on the parsed out risk elements, wherein each identified risk type has an assigned weight based on its probability of occurrence and an associated loss ratio;
calculate a delta between an actual risk level derived from an inspection report of the project and a predicted risk level at the time of the inspection and generate an alarm notification when the delta exceeds a predetermined threshold, wherein said alarm notification comprises the risk type that triggered the alarm notification, the severity of the risk, summary of corrective actions that could be taken, risk of loss, and estimated value of loss if the risk occurs, wherein the actual risk level is reduced upon completion of a corrective action;

generate, via said processor, a hazard map overlay for the project site, wherein the hazard map shows potential area hazards for the project site;

generate, via said processor, a risk analysis of risk associated with unattended mitigation steps in the one or more risk mitigation recommendations and duration of the unattended mitigation steps;

determine overall potential risk for the entire project based on the various risk types and hazards identified, any corrective actions taken, any unattended mitigation steps, and duration of the unattended mitigation steps;

limiting access by a user to information received from the user which is related to the risk elements parsed from the risk mitigation recommendations and is proprietary to that user; and transmitting via said communications means the generated risk analysis to one or more of the plurality of users including the at least one user to which access was limited.

11. The method of claim 10, further comprising the step of receiving an update, wherein said update changes the status of one or more unattended mitigation steps to attended.

12. The method of claim 11, further comprising the step of generating an updated risk analysis based on said update, wherein said updated risk analysis changes a probability of a risk event occurring.

13. The method of claim 10, wherein said risk analysis comprises probabilities of one or more risk events occurring.

14. The method of claim 13, wherein each of said one or more risk events comprise an event type.

15. The method of claim 10, further comprising the steps of:

receiving observation data, via a communications means, wherein said observation data is associated with one or more of said one or more risk mitigation recommendations;

receiving approval for said observation data; and generating a predictive model for risk occurrence across a time period occurring in the future, wherein the predictive model is generated as a function of the access-limited aggregated one or more risk mitigation recommendations.

16. The method of claim 15, further comprising the steps of:

receiving updated inspection information associated with said one or more risk mitigation recommendations;

generating updated risk analysis from said updated inspection information; and generating delta between said predictive model for risk occurrence and said updated risk analysis.

17. The method of claim 16, further comprising the step of generating an alert based on said delta when said delta exceeds a threshold for expected risk.

18. The method of claim 10, further comprising the steps of:

receiving a personnel assignment;

identifying location of said personnel assignment;

identifying one or more secondary projects in the vicinity of said location;

presenting option to the user to accept assignment of one or more of said one or more secondary projects;

confirming assignment of one or more of said one or more secondary projects; and assign said one or more of said one or more secondary projects to said user.

19. The system of claim 1, wherein metered access to various portions of the system are provided based on a user's role, said role being selected from the group consisting of: insurance company user, risk engineer user, insured user and insurance broker user, wherein each user is provided a graphical user experience based on that role.

* * * * *